United States Patent
Asahi et al.

(10) Patent No.: US 7,900,855 B2
(45) Date of Patent: Mar. 8, 2011

(54) METHOD FOR PRODUCING FULLERENE SUSPENSION

(75) Inventors: Tsuyoshi Asahi, Takatsuki (JP); Hiroshi Masuhara, Higashiosaka (JP); Teruki Sugiyama, koube (JP); Isamu Oh, Osaka (JP); Sen-ichi Ryo, Osaka (JP)

(73) Assignee: ABsize, Inc., Osaka-shi, Osaka (JP)

( * ) Notice: Subject to any disclaimer, the term of this patent is extended or adjusted under 35 U.S.C. 154(b) by 471 days.

(21) Appl. No.: 12/069,172

(22) Filed: Feb. 7, 2008

(65) Prior Publication Data

US 2008/0217445 A1 Sep. 11, 2008

Related U.S. Application Data

(63) Continuation-in-part of application No. PCT/JP2006/315178, filed on Jul. 31, 2006.

(30) Foreign Application Priority Data

Aug. 10, 2005 (JP) ................... 2005-232390

(51) Int. Cl.
*B02C 1/00* (2006.01)
*B02C 11/08* (2006.01)
*B02C 21/00* (2006.01)
*B02C 23/00* (2006.01)

(52) U.S. Cl. .............................. 241/1; 241/21

(58) Field of Classification Search .............. 241/1, 301, 241/21

See application file for complete search history.

(56) References Cited

U.S. PATENT DOCUMENTS

| 2001/0016283 A1* | 8/2001 | Shiraishi et al. ........... 429/218.2 |
| 2005/0008560 A1* | 1/2005 | Kataoka et al. ............ 423/445 R |
| 2005/0051644 A1* | 3/2005 | Paris et al. ........................ 241/1 |
| 2006/0192038 A1* | 8/2006 | Sekine ............................ 241/21 |

FOREIGN PATENT DOCUMENTS

| JP | 7206760 | 8/1995 |
| JP | 8003201 | 1/1996 |
| JP | 9235235 | 9/1997 |
| JP | 2001 113159 A | 4/2001 |
| JP | 2001348214 | 12/2001 |

(Continued)

OTHER PUBLICATIONS

*Comparative analysis of two aqueous-colloidal solutions of $C_{60}$ fullerene with help of FTIR reflectance and UV-Vis spectroscopy*, G.V. Andrievsky et al., Chemical Physics Letters, 364, pp. 8-17 (2002).

(Continued)

*Primary Examiner* — Bena Miller
(74) *Attorney, Agent, or Firm* — Henneman & Associates, PLC; Larry E. Henneman, Jr.

(57) ABSTRACT

The present invention provides a fullerene suspension and a method for producing a fullerene suspension having high dispersion stability without any chemical compound. Also, the fullerene suspension and its producing method makes it possible to be applied in various fields including the field of medical and pharmaceutical science and the field of foods and environment, in which the fullerene suspension obtained by the prior methods had not been applied. The fullerene is ground to form nanoparticles by irradiating a fullerene in a poor solvent with a laser. The pulse laser having a width of several-ten femtoseconds to several-hundred nanoseconds is appropriately applied.

8 Claims, 1 Drawing Sheet

FOREIGN PATENT DOCUMENTS

JP     2005001983     1/2005

OTHER PUBLICATIONS

Abstract of No. 7: *Ekichu Laser Ablation-ho ni yoru Carbon Nanotube Ethanol Bunsan'eki no Chosei*, Teruki Sugiyama et al., CSJ: The Chemical Society of Japan Dai 85 Shunki Nenkai, Mar. 11, 2005, p. 1158.

*Formation of hydrogen-capped polyynes by laser ablation of $C_{60}$ particles suspended in solution*, Masaharu Tsuji et al., Carbon, 2003, vol. 41, pp. 2141-2148.

*Generation of Singlet Oxygen with the Use of Optically Excited Fullerenes and Fullerene-Like Nanoparticles*, O.B. Danilov et al., 2003. 12, Optics and Spectroscopy, vol. 95, No. 6, pp. 833-842.

*Microsecond-resolved imaging of laser ablation at solid-liquid interface: investigation of formation process of nano-size metal colloids*, Takeshi Tsuji et al., Applied Surface Science, 2004, vol. 229, pp. 365-371.

*Preparation of an aqueous colloidal solution of fullerenes by laser ablation in water*, Hiroshi Tabata et al., Graduate School of Science and Technology, Kobe University, Kobe Japan (2005).

*Photoinduced Transformation of C60 Aggregates to Carbon Nanoballs*, Suzuki et al., Molecular Crystals And Liquid Crystals Science And Technology. Section A. Molecular Crystals And Liquid Crystals, Gordon And Breach Publishers, CH, CH; vol. 314-315, Jan. 1, 1998, pp. 221-232.

PCT Application No. PCT/JP2006/315178, International Search Report dated Oct. 3, 2006 (English Translation).

PCT Application No. PCT/JP2006/315178, Written Opinion dated Oct. 3, 2006.

PCT Application No. PCT/JP2006/315178, International Preliminary Report on Patentability dated Nov. 1, 2007 (English Translation).

EP Application No. 06782056, Supplemental European Search Report dated Apr. 3, 2009.

\* cited by examiner

METHOD FOR PRODUCING FULLERENE SUSPENSION

RELATED APPLICATIONS

This application is Continuation-In-Part Application of International Application No. PCT/JP2006/315178, filed on Jul. 31, 2006, which claims priority of Japanese Patent Application No. 2005-232390, filed on Aug. 10, 2005, the entire content and disclosure of the preceding applications are incorporated by reference into this application.

FIELD OF THE INVENTION

The present invention relates to a method for producing fullerene suspension. Particularly, the present invention relates to a method for easily producing fullerene suspension having high dispersion stability without any chemical compounds.

DESCRIPTION OF THE BACKGROUND ART

Generally, a fullerene is configured to have a hollow molecular about 1 nm in diameter, and the molecular comprises more than 60 carbon atoms connected in a basket shape. For example, $C_{60}$, which more than 60 carbon atoms are connected, forms a globular molecular shaped in a soccer ball about 0.7 nm in diameter.

The fullerene in such a mechanism is known to have specific electrochemical properties, mechanical properties, optical properties, and gaseous adsorption properties. Also, the fullerene is highly expected to be applied as a new functional substance in various fields, such as electronics, life science, and agricultural and livestock industries.

Especially, it is attractive to apply the fullerene in the field of life science.

Use of photodynamic therapy agent requires its capability of efficiency for generating active oxygen by the feeble light, and its low toxicity to human body.

$C_{60}$ has extremely high quantum yield ($\phi$=0.96) of generating singlet oxygen, compared to other representative photosensitizer such as methylene blue ($\phi$=0.52), rose bengal ($\phi$=0.83), and eosin ($\phi$=0.57) etc. Furthermore, it is estimated that $C_{60}$ has no toxicity to human body. Therefore, it is highly expected that $C_{60}$ is applicable to the photodynamic therapy agent.

However, it was difficult to administer $C_{60}$ inside the body due to the fact that $C_{60}$ was insoluble and had low-dispersibility in water. A lot of methods for dissolving or dispersing a fullerene in water had been previously disclosed.

Especially, a method for chemically-modifying a fullerene by water-soluble macromolecules described in Japanese Patent Publication No. H9-235235, a method for preparing a fullerene by clathrate compounds, such as Cyclophanes, Cyclodextrin, and Calix-[8]-arene described in Japanese Patent Publication No. H7-206760 and No. H8-3201, and a method for removing a organic solvent such as benzene, toluene, and tetrahydrofuran, in which fullerene is dissolved to be mixed-up with water (solvent exchange method) described in Japanese Patent Publication No. 2001-348214, and Non-Patent document titled "G. V. Andrievsky, V. K. Klosevuch, A. B. Bordyuh, G. I. Dovbeshko, Comparative analysis of two arueous-colloidal solutions of C60 fullerene with help of FTIR reflectance and UV-Vis spectroscopy, C. P. L. 364. 8-17 (2002)" are representative and well-known.

However, there is each problem in the prior arts as mentioned above.

In the first method, more specifically, in the method for modifying a fullerene by water-soluble macromolecules, there is a concern that specific physical properties of fullerene may be changed due to the chemical modification, in which may result in the expression of the carcinogenicity.

In the second method, more specifically, in the method for preparing fullerene by clathrate compounds such as Cyclophanes, it requires very complicated operation, and is impossible to obtain a pure fullerene suspension.

Using the third method, more specifically, a method for removing an organic solvent such as benzene in which a fullerene is dissolved to be mixed-up with water, many researchers have attempted to prepare various suspension, and they release a bunch of tractates. But, in the tractates, it is pointed out that the residual of the organic solvent is remained. Adjustment of the suspension by the method is acted, and various tractates are released. But, it is pointed out that the residual of the organic solvent is remained.

The methods for dissolving or dispersing a fullerene in water have been well known. However, in each of the prior methods, there are problems as mentioned above. Therefore, the fullerene suspension obtained by the methods was only applied in the limited fields. Especially, it was difficult to apply in a photodynamic therapy agent used in the field of medical and pharmaceutical science. It was also difficult to apply in the field of foods and environment.

In order to overcome these problems in the prior art, the present invention provides a method for producing fullerene suspension having high dispersion stability without any chemical compounds. Also, the method for producing the fullerene suspension makes it possible to be applied in various fields including the field of medical and pharmaceutical science and the field of foods and environment, in which the fullerene suspension obtained by the prior methods had not been applied.

SUMMARY OF INVENTION

In one embodiment of the present invention, a method for producing fullerene suspension comprises irradiating fullerene particles in water with pulse laser to crush the fullerene particles into the nanoparticles, wherein the pulse laser is irradiated at excitation light intensity of 30 to 50 mJ/cm$^2$.

In another embodiment of the present invention, the step of irradiating fullerene particles in water with pulse laser includes stirring the fullerene particles mixed with water.

Yet in another embodiment of the present invention, the pulse laser has a width of several-ten femtoseconds to several-hundred nanoseconds.

Yet in another embodiment of the present invention, the fullerene is $C_{60}$ fullerene.

In one embodiment of the present invention, fullerene suspension having high dispersion stability without any dispersing agent etc. is obtained by irradiating laser to the fullerene particles mixed in water, and then grinding the fullerene particles into the nanoparticles. Furthermore, the obtained fullerene suspension has high dispersion stability without any other chemical compounds, so that the fullerene suspension may be applied in various fields including the field of medical and pharmaceutical science and the field of foods and environment, in which the fullerene suspension obtained by the prior methods had not been applied. Applying pulse laser for the laser irradiation makes it possible to increase a peak output compared to continuous-wave laser. Therefore, the pulse laser allows the fullerene particles to be crushed certainly. Furthermore, pulse laser irradiation at the excitation light intensity of 30 to 50 $mJ/cm^2$ makes it possible to crush the fullerene particles certainly, and to prevent the fullerene from being damaged.

In another embodiment of the present invention, while in the step of irradiating the fullerene particles with laser, the water with the fullerene particles is stirred, so that the laser may be irradiated to the fullerene particles mixed in the water evenly and certainly. Therefore, the fullerene particles having high dispersion stability may be obtained efficiently and exactly.

Yet in another embodiment of the present invention, the pulse laser has the pulse width of several-ten femtoseconds to several-hundred nanoseconds. Accordingly, it is possible to crush the fullerene particles efficiently and certainly.

Yet in another embodiment of the present invention, the fullerene is $C_{60}$ fullerene. Accordingly, it is possible to apply the obtained fullerene suspension in the photodynamic therapy agent for cancer.

BRIEF DESCRIPTION OF THE DRAWINGS

Hereunder, the preferred embodiments of the method for producing fullerene suspension according to the present invention will be described with reference to the accompanying drawings.

DETAILED DESCRIPTIONS

In the method of producing the fullerene suspension according to the present invention, fullerene particles are added in poor solvent, and are irradiated with laser, so that the fullerene particles are ground to form their nanoparticles.

Before explaining the method of producing the fullerene suspension of the present invention, a brief description will be given for a producing apparatus used in the method of the present invention.

Figure 1:
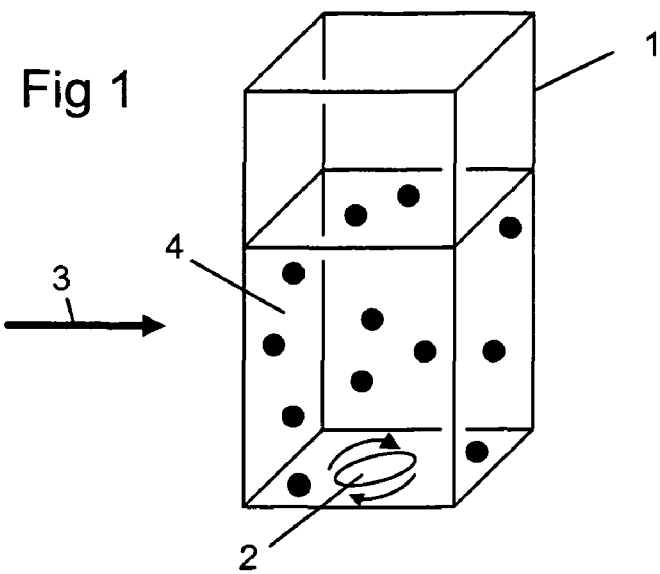
FIG. 1 is a schematic diagram illustrating one example of a producing apparatus used in a method of producing fullerene suspensions according to the present invention.

FIG. 1 is a schematic diagram illustrating one example of a producing apparatus used in a method of producing the fullerene suspension according to the present invention.

The producing apparatus includes a container (1) for retaining a poor solvent with the fullerene particle added therein, a stirring apparatus (2) for stirring fullerene suspending solution (4) added therein, and laser irradiation device (not shown) for irradiating laser (3) to the fullerene particles contained in the poor solvent in the container (1).

The container (1) is made of a material which a laser light can pass through. For example, the container (1) is made of a transparent material such as glass and quartz.

In the present invention, the poor solvent to be mixed with the fullerene particles in the container (1) may include water, methanol, ethanol, n-pentane, and cyclopentane. The most typical poor solvent may be water. In the following explanation, water is used as the poor solvent, and the other types of poor solvents (stable against light, and to which the fullerene exhibits poor solubility or insolubility) may be also used instead of water.

The stirring apparatus (2) is configured to stir the fullerene suspending solution in the container (1). A magnetic stirrer is used as an example of the stirring apparatus (2) shown in FIG. 1, and other mechanical means such as stirring vanes may also be used.

The types of laser irradiation equipment to be used may be solid state lasers such as YAG laser, titanium-sapphire laser, and ruby laser, semiconductor lasers such as GaAs laser, gas lasers such as excimer laser, Ar ion laser, and $CO_2$ laser, and then liquid lasers such as dye laser.

The type of oscillation to be used may be pulse oscillation.

The method of producing the fullerene suspension according to the present invention will be explained in detail below.

First, the fullerene particles are suspended in water in the container (1). It is not required to add dispersing agent in order to avoid the residuals of that dispersing agent in water.

Any carbon number such as $C_{60}$ $C_{70}$ $C_{74}$ $C_{76}$ $C_{78}$ $C_{80}$ $C_{82}$ $C_{88}$ $C_{90}$ or $C_{96}$ may be solely used as the fullerene in the present invention. The mixtures of the carbons may be also used as the fullerene in the present invention, but the fullerenes in the present invention are not limited to them. Furthermore, a metal-containing fullerene as well as hollow fullerene may be used in the present invention.

In the present invention, $C_{60}$ (hollow fullerene) is preferably used in the above-described kinds of the fullerenes, because $C_{60}$ has a high quantum yield of generating singlet oxygen and is expected to be no toxic against human body. Also, relatively, the $C_{60}$ is easily-obtainable. Therefore, at present, it is highly expected that the fullerene solution is applicable to the photodynamic therapy agent for cancer.

The fullerene to be mixed with water may be synthesized crude powder, but it is preferable to use pretreated ground particles (micro crystals). In this case, a mean particle size of the micro crystals is preferably about 1-100 μm. This is because it takes a longer time to grind the particles larger than 100 μm so as to form the nanoparticle. Therefore, it reduces the processing efficiency. Moreover, it is impractical to grind the particles in a pretreatment process until a size thereof becomes less than 1 μm.

From the viewpoint of the efficiency of nanoparticle preparation by laser irradiation, it is preferable to determine an appropriate amount of the fullerene to be mixed with water. For example, the amount of the fullerene may be 80-400 μg per 1 ml of water.

In the next step, the water mixture of the fullerene (the fullerene suspending solution) is stirred using the stirring apparatus (2). Then the fullerene in the suspending solution is irradiated with the laser using the laser irradiation device, as the suspending solution is continuously stirred.

When the fullerene in water is irradiated with the laser, the fullerene particles absorb the laser light to be rapidly and locally heated, which results in the light-absorbing region of the fullerene particles.

In the light-absorbing region, the temperature of the particles increases instantly upon the laser irradiation. In the meanwhile, around the light-absorbing region, the temperature of the particles increases due to heat conduction. Therefore, when the fullerene powder has a relatively larger particle size, a marked temperature difference occurs between the light-absorbing region and the non-light absorbing region. Then, a marked inner stress is created between the laser-irradiated region and its periphery in the particles so that the particles are cracked, and crushed.

When the fullerene particles exhibit high absorption relative to a wavelength of the laser light, optical absorption mainly occurs on the particle surface, thereby causing a temperature difference between the light-irradiated surface and the inner region. In such cases, the surrounding water cools the particle surface. This results in temperature gradient between the surface and the inner region, which causes stress in the particles and crushes them.

The lasers to be irradiated may be, but not limited to, a laser with a wavelength of ultraviolet light, visible light, near-infrared light, and far-infrared light. A laser type may be selected from a known solid-state laser, a semiconductor laser, a gas laser, and a liquid laser described above.

The laser with an approximate 200-600 nm wavelength is preferred. When the wavelength is shorter than 200 nm, photoenergy of the laser is easily absorbed by water. Especially, it is not negligible that the wavelength of the laser shorter than 200 nm may be absorbed by glass- and quartz-made containers. When the wavelength is longer than 600 nm, it is likely to result in inefficient crush of the fullerene particles.

Examples of lasers used in this invention include the 2nd, 3rd, and 4th harmonics (532 nm, 355 nm, and 266 nm, respectively) of $Nd^{3+}$: YAG laser (basic wavelength: 1064 nm), excimer laser (193 nm, 248 nm, 308 nm, and 351 nm), nitrogen laser (337 nm), and Ar ion laser (488 nm or 514 nm).

A type of oscillation of the laser to be irradiated may preferably include pulse oscillation. It is preferable to use the pulse laser with a pulse width of several-ten femtoseconds to several-hundred nanoseconds, in view of efficiency of crushing the fullerene particles.

For example, the preferable range of the excitation light intensity is 30-50 $mJ/cm^2$. The excitation light intensity lower than 30 $mJ/cm^2$ may not be high enough to crush the fullerene particles. The excitation light intensity higher than 50 $mJ/cm^2$ may degrade the fullerene.

In terms of the process efficiency, an appropriate range of pulse repeat frequency may be preferably higher repeat frequency. However, high repeat frequency heats water to be less difference in temperature between water and the fullerene particles, thereby lowering the crushing efficiency.

Thus, it is preferred to set high repeat frequency to the extent that the water temperature does not excessively increase. When the excimer laser is used, the frequency is set within a range of 5-20 Hz.

In the invention, a cooling device may be used to cool the container (1) for controlling the temperature of the fullerene suspending solution therein to be lower than a predetermined temperature (for example, 10° C. or lower). Thus, it is possible to avoid a reduction in process efficiency resulting from the increase in water temperature caused by the laser irradiation as described above.

As described above, when the water temperature is maintained lower than a certain temperature, it is possible to generate the marked temperature difference between water and the fullerene particle surface as well as between the fullerene particle surface and the inner region thereof. The fullerene particles are then easily crushed upon the laser irradiation.

EXAMPLES

The following example is shown to clarify the effect of the present invention, but the present invention is not limited to it. The fullerene suspension was produced using the producing apparatus shown in FIG. 1.

First, water was contained in the container (1). The fullerene particles ($C_{60}$) (microcrystals), which were the basic ingredients for the fullerene suspension, were then provided in the water.

The provided fullerene particles were precipitated to the container bottom, which made the supernatant solution almost transparent. The water in the container was stirred using a magnetic stirrer, so that the fullerene particles were suspended in the water.

The water mixed with the fullerene particles was then irradiated with the 2nd harmonics (wavelength: 532 nm, half pulse width: 7 ns, repeat frequency: 10 Hz) of nanosecond $Nd^{3+}$: YAG laser at an excitation light intensity of 50 $mJ/cm^2$ using laser irradiation device so as to induce ablation. The fullerene particles were ground in water so that yellow and transparent colloid solution was obtained.

The supernatant solutions before/after laser irradiation are respectively dripped on a hydrophobic-treated silicon boards. After drying process, the fullerene particles in both of the supernatant solutions were observed by scanning electron microscopy (SEM). In the pre-laser irradiated supernatant solution, the $C_{60}$ nanoparticles were observed to have a particle size about several hundreds μm. On the other hand, in the laser irradiated supernatant solution, the $C_{60}$ globular nanoparticles were observed to have a 10-80 nm particle size.

Then, using UV-Vis absorption spectrophotometer, absorption spectrums were measured in the two suspensions. One was the laser-irradiated fullerene suspension centrifuged at a rotational speed 2000 rpm, and the other was the same centrifuged suspension set in a light-shielded place for 2 weeks.

Figure 2:
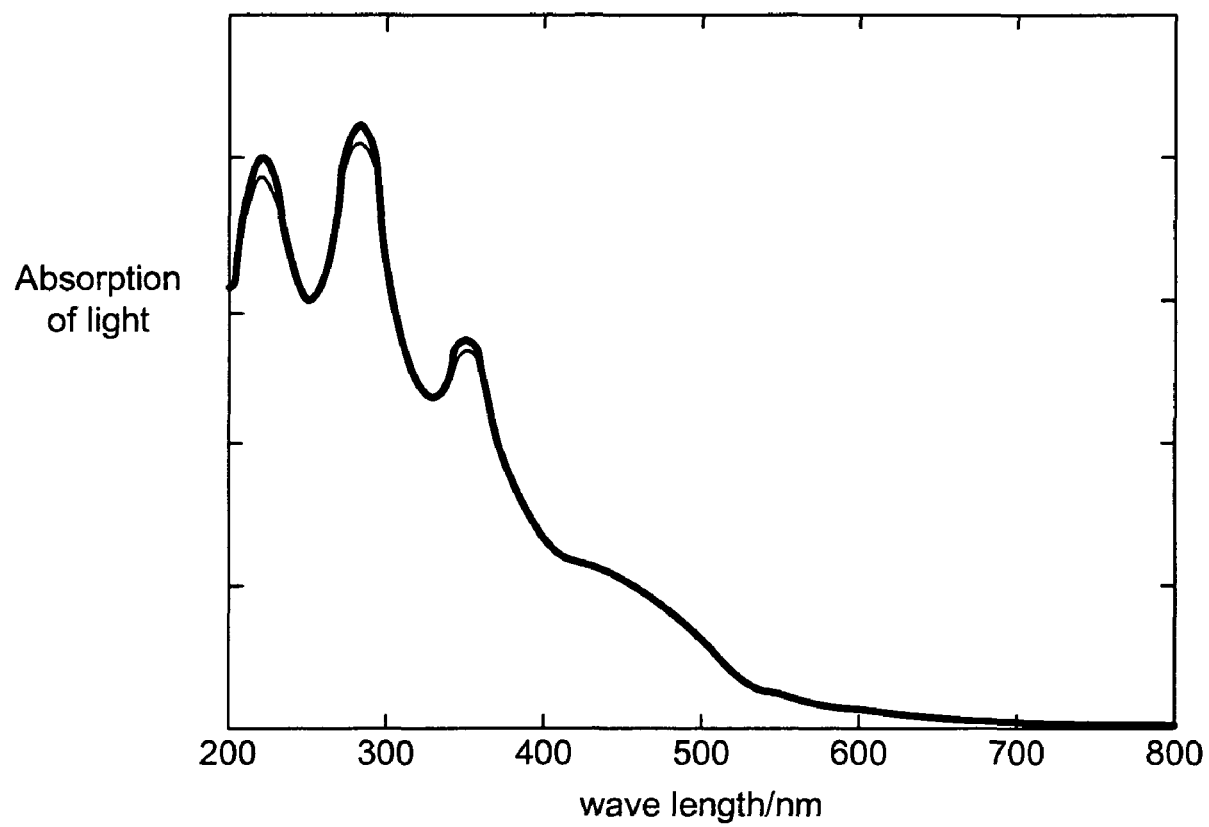
FIG. 2 is a diagram illustrating the comparison of the absorption spectrums of the centrifuged suspension just after the production and 2 weeks after the production.

The result of the measurement is shown in FIG. 2. In the FIG. 2, a bold line (an upper line) indicates the absorption spectrum of the centrifuged suspension, and a thin line (a lower line) indicates the absorption spectrum of the centrifuged suspension rest for 2 weeks.

It was confirmed that the fullerene solution obtained by the present invention had superior suspension stability, because of fewer changes in the absorption spectrums between both of the suspensions in FIG. 2.

It is possible to use the fullerene solution obtained by the present invention in the various fields such as electronics, life science, and agricultural and livestock industries. Especially, the fullerene solution is highly applicable to the field of medical and pharmaceutical science.

What is claimed is:

1. A method for producing fullerene suspension comprising:
    irradiating fullerene particles in water with pulse laser to crush the fullerene particles into the nanoparticles,
    wherein the pulse laser is irradiated at excitation light intensity of 30 to 50 $mJ/cm^2$.

2. The method for producing the fullerene suspension according to claim 1, wherein the step of irradiating fullerene particles in water with pulse laser includes stirring the fullerene particles mixed with water.

3. The method for producing the fullerene suspension according to claim 1, wherein the pulse laser has a width of several-ten femtoseconds to several-hundred nanoseconds.

4. The method for producing the fullerene suspension according to claim 2, wherein the pulse laser has a width of several-ten femtoseconds to several-hundred nanoseconds.

5. The method for producing the fullerene suspension according to claim 1, wherein the fullerene is $C_{60}$ fullerene.

6. The method for producing the fullerene suspension according to claim 2, wherein the fullerene is $C_{60}$ fullerene.

7. The method for producing the fullerene suspension according to claim 3, wherein the fullerene is $C_{60}$ fullerene.

8. The method for producing the fullerene suspension according to claim 4, wherein the fullerene is $C_{60}$ fullerene.

* * * * *